United States Patent [19]
Duchenne et al.

[11] Patent Number: 6,039,466
[45] Date of Patent: Mar. 21, 2000

[54] MOTOR VEHICLE HEADLIGHT EQUIPPED WITH A DEVICE FOR ADJUSTING THE ANGULAR POSITION OF A REFLECTOR CONTAINED THEREIN

[75] Inventors: Laurent Duchenne, Etterbeek; Benony Grigorescu, Waterloo; Jean-Pierre Loiselet, Rebaix, all of Belgium

[73] Assignee: Valeo Vision, Bobigny, France

[21] Appl. No.: 08/991,366

[22] Filed: Dec. 16, 1997

[30] Foreign Application Priority Data

Dec. 16, 1996 [FR] France .................................. 96 15420
Dec. 16, 1996 [FR] France .................................. 96 15422

[51] Int. Cl.[7] .................................................... F21V 14/04
[52] U.S. Cl. .......................... 362/515; 362/514; 362/284
[58] Field of Search ................................... 362/514, 515, 362/284

[56] References Cited

U.S. PATENT DOCUMENTS

| | | | |
|---|---|---|---|
| 3,931,511 | 1/1976 | Puyplat | 240/41.3 |
| 4,503,486 | 3/1985 | Makita | 362/284 X |
| 4,831,506 | 5/1989 | Miyazawa | 362/284 X |
| 5,032,964 | 7/1991 | Endo et al. | 362/514 X |
| 5,067,056 | 11/1991 | Suzuki et al. | 362/514 X |
| 5,140,504 | 8/1992 | Sato | 362/514 X |
| 5,343,372 | 8/1994 | Shirai et al. | 362/284 X |

FOREIGN PATENT DOCUMENTS

| | | |
|---|---|---|
| 0 562 581 | 9/1993 | European Pat. Off. . |
| 2 009 762 | 2/1970 | France . |
| 2 254 956 | 7/1975 | France . |
| 2 559 108 | 8/1985 | France . |
| 1 560 011 | 3/1996 | France . |
| 1 231 373 | 5/1971 | United Kingdom . |

OTHER PUBLICATIONS

Patent Abstracts of Japan vol. 8, No. 73 (M–287)[1510], Apr. 5 1984 & JP 58 218441 A (Honda Giken Kogyo KK).
French Search Reports dated Sep. 8 1997.

*Primary Examiner*—Laura K. Tso
*Attorney, Agent, or Firm*—Morgan & Finnegan, LLP

[57] ABSTRACT

A motor vehicle headlight has a light source, a reflector co-operating with the light source to form a beam of predetermined photometry, a housing which contains the reflector and the lamp that includes the light source, and a cover glass closing the front of the housing. An adjusting device is provided for varying the orientation of the beam by pivoting the reflector about a tilting axis. The lamp is mounted in a fixed position in the casing, and the tilting axis of the reflector passes close to the light source. The adjusting device includes a rotary maneuvering member having a driving spigot which is eccentric to the axis of rotation of the maneuvering member. The spigot is arranged to slide, substantially without clearance, in a slot formed in an element fixed to the reflector. This slot is oriented substantially transversely to the axis of the rotary member and transversely to the direction of displacement of the reflector. The rotary member can be turned freely on itself over more than 360°.

The invention is applicable in particular to complementary headlights such as long range driving lights or fog lights.

17 Claims, 2 Drawing Sheets

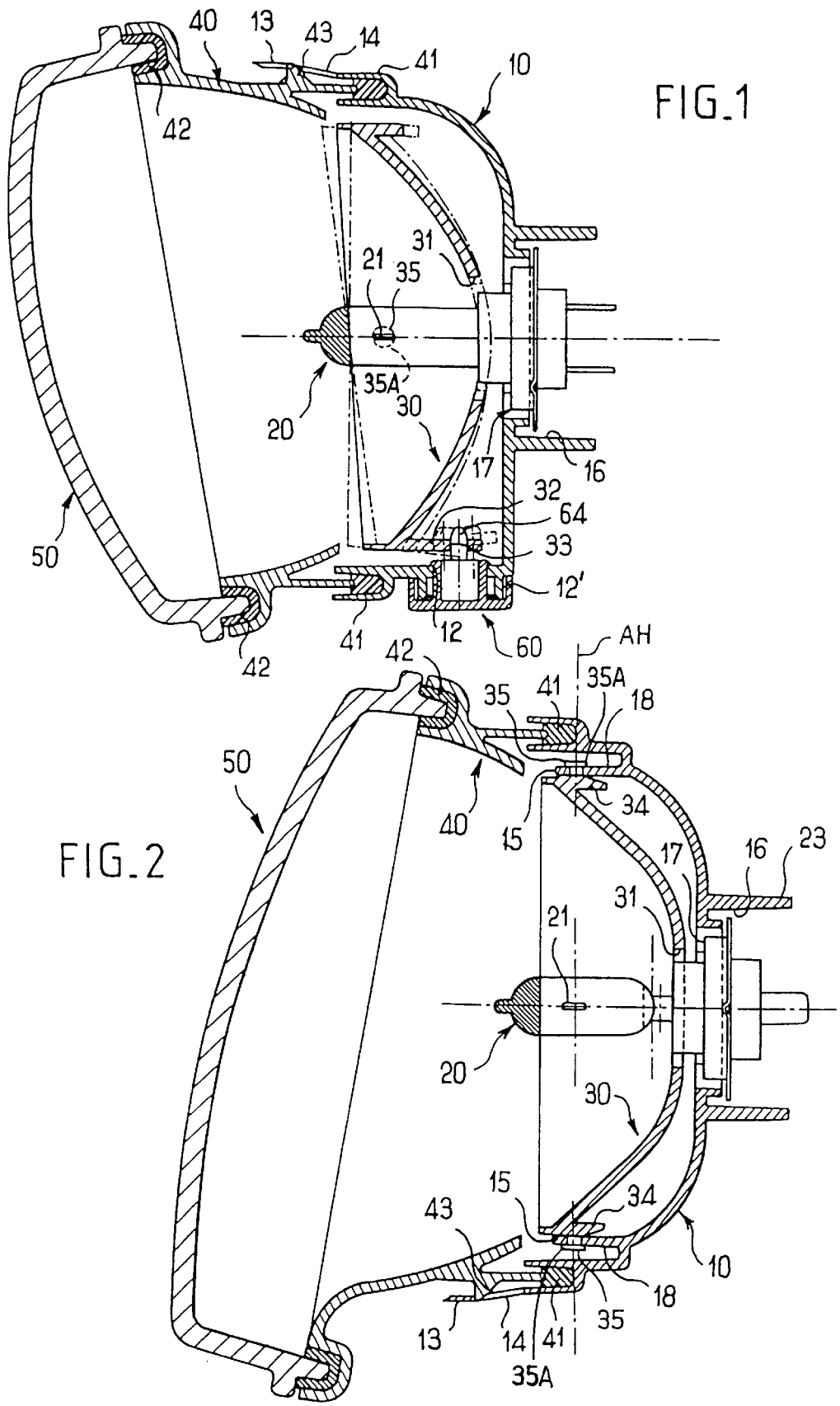

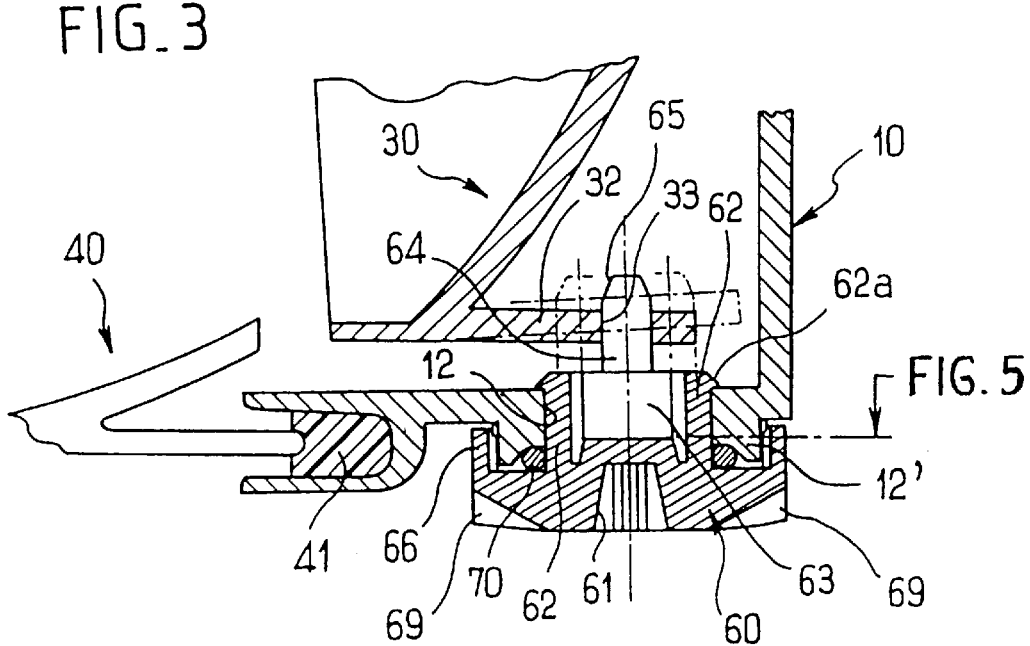
FIG_3
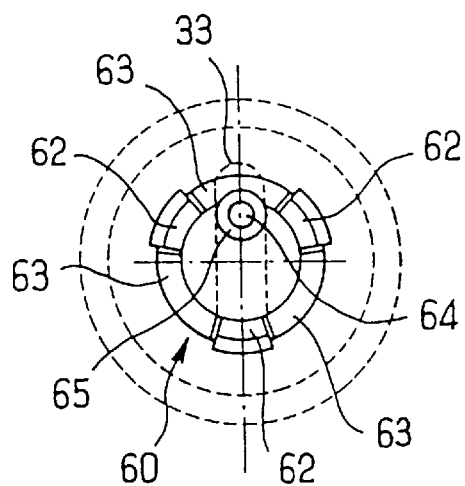
FIG_4
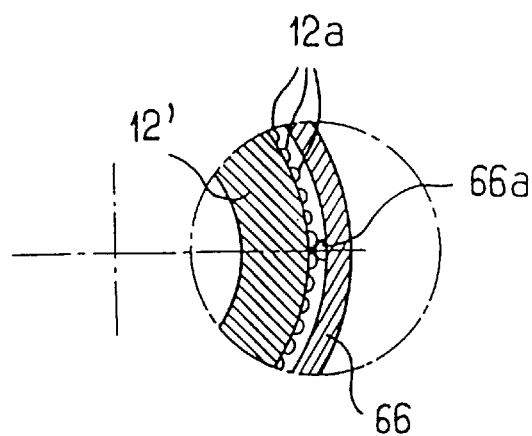
FIG_5

MOTOR VEHICLE HEADLIGHT EQUIPPED WITH A DEVICE FOR ADJUSTING THE ANGULAR POSITION OF A REFLECTOR CONTAINED THEREIN

FIELD OF THE INVENTION

The present invention relates in general terms to headlights, especially complementary headlights such as long range driving lights or fog-lights, for motor vehicles such as automobiles.

BACKGROUND OF THE INVENTION

It is common for a pair of complementary headlights to be provided in high performance road vehicles, or those in the middle of the performance range, being incorporated for example in the front shield panelling of the vehicle. Usually they consist of long range headlights or fog-lights. It is usual to design one type of complementary headlight that will be standard for various different types or models of vehicles, by arranging the means for mounting the headlight on the vehicle so that they can be adapted as easily as possible to different vehicle types. In this connection it is necessary to equip this type of headlight with means for adjusting the beam, in particular on site, because after being fitted on the vehicle, headlights are likely to have different orientations according to the particular vehicles in which they are fitted.

This adjustment is usually obtained by using appropriate adjusting means to tilt the assembly consisting of the reflector and the lamp (light source), the lamp being fixed with respect to the reflector. The purpose of the adjustment is of course to set the light beam at a suitable height. One disadvantage of this known arrangements is that in order to close the headlight sealingly while at the same time enabling a defective lamp to be replaced, it is necessary to close the posterior part of the housing of the headlamp with a trap for giving access to the lamp. This trap constitutes an additional component which increases the selling cost of the unit.

In addition, it is the reflector, which is made of a synthetic material more expensive than the housing, that has to include particular arrangements for mounting the lamp on the reflector, and these arrangements may occupy a substantial volume.

Finally, the lamp and the lamp carrier are quite heavy, and their weight must be supported by the reflector, so that the latter therefore has to be designed to take this into account, with suitable reinforcement, and therefore further material, will be included if necessary.

The amount of possible displacement of a lamp together with its reflector, for adjustment purposes, is conventionally restricted by the fact that no off-set in the position of the lamp with respect to the reflector, outside normally acceptable tolerances, is regarded as desirable by workers in this field.

The adjusting means in the prior art conventionally include a member which can be maneuvered either manually or electrically to cause the reflector, carrying the lamp, to tilt about an axis within a range of angles defined by end-stop abutments carried either by the reflector itself or by the adjusting member. One disadvantage of this known type of adjusting device is that a clumsy or incompetent operator will run the risk, when an end-stop abutment is encountered without satisfactory adjustment having been achieved, of forcing the adjusting member so as to cause irreversible deformation to the component that defines the end stop, or even purely and simply its rupture.

DISCUSSION OF THE INVENTION

First, it should be noted that, in order to meet the current reluctance of designers to allow any offset between the lamp and the reflector, mentioned above, we have found that under certain conditions it is possible to accept an offset of the lamp with respect to the reflector beyond normal tolerances, without this being at all prejudicial to the photometry of the beam produced by the headlight.

One object of the present invention is to provide an adjusting device for a motor vehicle headlamp, in which the weight carried by the reflector is reduced.

Another object is to eliminate the need for an access trap in order to gain access for replacing a defective lamp.

A further object of the present invention is to provide an adjusting device which, while enabling precise adjustments to be made within a well-determined angular range, avoids the risk of damage to any element defining an end-stop point.

Yet another object of the invention is to reduce the manufacturing cost of the headlamp and to improve the possibilities of standardization of components.

According to the invention in a first aspect, a motor vehicle headlight, especially a complementary headlight, of the type comprising a light source, a reflector co-operating with the light source to produce a beam of required photometry, a housing receiving the reflector and the lamp and closed by a cover glass, and a device for adjusting the orientation of the beam by pivoting of the reflector about a tilting axis, wherein the light source is fixed in the housing, and in wherein the tilting axis of the reflector passes close to the light source.

Preferably, the reflector has a reflective surface which is adapted to distribute images of the light source in such a way as to generate by itself a beam having a predetermined photometry, the tilting axis of the reflector passing through the light source. In that case, the tilting axis preferably passes close to the center of the light source in the axial direction.

According to a preferred feature of the invention, the tilting axis is horizontal and extends generally at right angles to the axis of the reflector. In that case the tilting axis preferably passes close to the lower edge of the light source. Alternatively or in addition, the axis of the reflector is preferably defined by two pins or spigots projecting outwardly from the side edges of the reflector, the said pins being engaged in apertures formed in the housing.

In preferred embodiments of the last mentioned case, the said pins are engaged by snap fitting in the through apertures formed in webs or first bracket elements formed integrally with the housing.

According to another preferred feature of the invention, the headlight includes means for fastening the headlight on the vehicle, and an intermediate member extending between an anterior edge of the housing and the periphery of the cover lens, the fastening means being disposed on the intermediate member.

In a second aspect, the invention provides a motor vehicle headlight comprising a housing, a light source and a reflector mounted within the housing, and a cover glass, the reflector being mounted for tilting movement about a tilting axis, and the headlight further including an adjusting device adapted to displace a part of the reflector, situated remote from the tilting axis, in a given direction essentially transverse to the tilting axis, wherein the adjusting device comprises a rotatable maneuvering member carrying a drive element which is disposed eccentrically with respect to the axis of rotation of the maneuvering member, the drive element being received in a driven element fixed with respect to the reflector in such a way as to be able to slide substantially without clearance in a slot in the driven element, the slot being oriented substantially transversely to the axis of the rotatable member and transversely to the direction of displacement, and in that the rotatable member is able to be turned freely on itself over more than 360°.

In preferred embodiments of the headlight in this second aspect of the invention, the tilting axis of the reflector is horizontal, the axis of rotation of the maneuvering member is vertical, and the slot extends in the horizontal direction which is substantially parallel with the tilting axis. In that case, preferably, the maneuvering member is mounted in an aperture formed in the lower wall of the housing. In such a case, the said slot is preferably formed in a second bracket element extending rearwardly from the base of the reflector.

According to a further preferred feature of the invention, the maneuvering member extends through an aperture formed in the housing, and includes a plurality of snap-fitting lugs extending in profile along a circle. In such a case, preferably, the driving element is formed on a substantially rigid skirt portion extending between two snap-fitting lugs.

According to yet another preferred feature of the invention, the housing and the maneuvering member include two surfaces in facing relationship with each other and having concentric circular profiles, a first one of the said surfaces includes a plurality of projecting elements slightly spaced apart from each other, and the other surface includes at least one projecting element adapted to occupy a stable position between two of the projecting elements of the first surface, and to engage the projecting elements of the first surface by elastic deformation.

In preferred embodiments of this last mentioned case, one of the surfaces is an internal face of a backwardly facing peripheral flange of the maneuvering member, while the other surface is an external face of an outwardly projecting rib formed on the housing. The rib preferably defines a seating for a sealing member.

According to yet another preferred feature of the invention, the maneuvering member includes a substantially flat external surface in which a socket is formed for engagement by a driving tool.

Further features and advantages of the invention will appear more clearly on a reading of the following detailed description of a preferred embodiment of the invention, which is given by way of non-limiting example only and with reference to the accompanying drawings.

BRIEF DESCRIPTION OF THE DRAWINGS

FIG. 1 is a view in vertical axial cross section of a headlight according to the invention.

FIG. 2 is a view in horizontal axial cross section of the same headlight as shown in FIG. 1.

FIG. 3 is a view in vertical axial cross section on an enlarged scale, showing a preferred embodiment of an adjusting device for the headlight of FIGS. 1 and 2.

FIG. 4 is a top plan view of an adjusting member which is part of the adjusting device of FIG. 3.

FIG. 5 is a scrap view in transverse cross-section taken on the line V in FIG. 3.

DESCRIPTION OF A PREFERRED EMBODIMENT OF THE INVENTION

Reference is first made to FIGS. 1 and 2 of the drawings, which show a complementary headlight, or driving light, for a motor vehicle. The headlight comprises a posterior housing 10, a front cover lens 50, and an annular intermediate housing shell 40 which connects the housing 10 and the lens 50 together sealingly. For this purpose, two peripheral seals 41 and 42 are interposed. The intermediate shell 40 has a peripheral anterior groove which mates with a projecting posterior rib of the front lens 50, with the seal 42 interposed between them, while at its rear or posterior end the shell 40 has a terminal rib received in a forward facing peripheral groove of the posterior housing 10, with the seal 41 interposed. The intermediate shell 40 is fixed on the housing 10, compressing the seal 41, by means of resilient snap-fitting teeth 43 which are formed integrally with the shell 40, and which are clipped into apertures 14 formed in forwardly facing extensions 13 of the housing 10, on the outside of the groove in the latter that receives the seal 41.

It will be noted here that, advantageously, the intermediate shell 40 may itself include all the means for fastening the headlight in the vehicle. In that connection, when a headlight in accordance with the invention has to be installed in vehicles of different types, thus making it necessary to provide fastening means adapted for the particular vehicle type, it is sufficient to provide a shell 40 which is designed to be appropriate to the vehicle concerned, all the other components of the headlight being then able to remain identical for all vehicle types. In this way, the number of different components to be stocked, and therefore the overall cost of manufacture, are reduced.

The housing 10, shell 40 and lens 50 together define a closed space which contains a reflector 30 and a lamp 20. The lamp 20 is carried by a lamp carrier (not shown), which is fixed sealingly, by means of a suitable seal, in a cylindrical cavity 16 formed in a collar 23 formed in the rear of the housing 10. This cavity 16 is open into the closed space mentioned above, through an aperture 17 in tha back of the housing, through which the lamp 20 extends.

Around the lamp 20 an occulter or mask (not shown) may optionally be fitted. This mask is so designed that radiation from the filament of the lamp 20 is only able to be directed towards the reflector 30.

The reflector 30 is not in a fixed orientation with respect to the lamp 20. The reflector includes a base aperture 31 through which the lamp 20 extends with an appropriate clearance, as will be seen later in this description. The reflector is preferably of the type capable of forming a beam with a desired configuration, by projecting, with controlled distribution of the light, images of the filament 21 of the lamp 20. The cover lens 50 is preferably of a smooth type, that is to say it does not deviate the light or it hardly deviates the light.

Typically, the beam produced is an anti-fog beam, having a substantial width and limited by a generally horizontal cut-off line. The beam may equally well be a long range driving beam, with a strong point of light concentration in the axis of the headlight. Various examples of reflective surfaces for these purposes are given in French patent specifications numbers FR 2 536 503 A, FR 2 600 024 A, FR 2 602 305 A, FR 2 609 146 A, FR 2 639 888 A and FR 2 664 677 A, all in the name of Valeo Vision S.A. The reflective surface used here is preferably of the kind described in one of the specifications FR 2 639 888 A and FR 2 664 677 A, or it may be a combination of these surfaces.

A headlight such as is described above, especially when it is designed to act as a complementary headlight, must enable the height of the beam produced to be adjusted, firstly in order to enable it to be mounted with different orientations in different types of vehicles, and secondly in order to compensate for any manufacturing tolerances and any other fitting tolerances.

The reflector 30 is articulated about a horizontal axis AH (see FIG. 2), which preferably passes through the center of the lamp filament 21, and intersects the optical axis of the reflector 30. For this purpose, the reflector 30 has two backwardly facing stiffening wing elements 34 extending from its lateral edges. Two coaxial cylindrical pins 35 project outwardly, each from a respective one of the wing elements 34.

As to the posterior housing 10, this includes two webs or bracket elements 18, which extend forward and which are formed with notches 15 in which the pins 35 are received, in a close fit but without being jammed in the notches, so as to mount the reflector 30 in the housing 10 in such a way that the reflector is able to tilt about the axis AH, which is coincident with the common axis of the two pins 35.

The profile of the notches 15 is preferably such that mounting of the reflector 30 on the housing 10 is obtained by elastic snap fitting of the pins 35 in the notches 15. It is also preferred that the pins 35 have widened heads 35a which trap the webs 18, in the direction of the axis AH, between the heads 35a of the pins and the wing elements 34 of the reflector.

As explained above, the aperture 31, formed in the base of the reflector 30 to permit free passage of the lamp 20 through it, is so dimensioned as to prevent the lamp 20 from being an obstacle to the tilting movement of the reflector 30 within a predetermined range of angles, for example by ±5° on either side of the horizontal.

The headlight also includes a device for adjusting the angular position of the single reflector 30, in such a way as to set the beam produced by the headlight at the required height.

In the present example, and as shown in greater detail in FIGS. 3 to 5, to which reference is now made, this adjusting device includes, on the same side as the reflector 30, an essentially horizontal flat bracket element or membrane 32, which extends rearwardly from the lower edge of the reflector 30. An oblong slot is formed in the bracket element 32, this slot having a major axis that extends parallel to the axis AH.

The adjusting device also includes a maneuvering and driving member, generally indicated by the reference numeral 60. The maneuvering member 60 has the general form of a plug with a click-action external collar portion. The member 60 is rotatable in a circular hole formed in the lower wall of the housing 10. More precisely, the housing 10 has a circular hole 12 surrounded by an annular rib 12' which projects downwards. A wedge-shaped seating is formed on the free surface of the rib 12', for engaging a toroidal sealing ring 70.

As to the maneuvering member 60 itself, this comprising a main portion of circular contour, which is thickened in the middle, and on the outer surface of which there is formed a socket 61 for receiving an adjusting tool. The socket 61 may for example be a hexagonal socket, or a socket of the "TORX" or cruciform type. In the outer surface of the member 60, there are also formed at its periphery a set of notches 69, which are designed to be displaced generally tangentially with the aid of the point of a screwdriver or similar tool, so as to enable the reflector 30 to be adjusted from the rear, or from the front, or from the side of the headlight.

An annular skirt portion, including three lugs 62, extends upwardly from the circular main portion of the maneuvering member 60. These lugs 62 are resiliently deformable inwardly, and are formed with clipping teeth 62a on the outside of the free end of each lug 62. The annular skirt portion also includes three fixed elements 63, which lie between the lugs 62 and which are separated from the latter by narrow radial slots.

The maneuvering member 60 has, around this skirt portion, a radial surface which is adapted to compress the O-ring seal 70 in its seating during the operation of fitting the member 60 in place. This operation ends with the lugs 62 being snap fitted elastically into the hole 12 in the housing 10.

The member 60 further includes an upwardly extending peripheral flange 66 which surrounds the annular rib 12' of the housing; and a projecting driving element in the form of a spigot 64, which extends upwardly from the free edge of one of the fixed elements 63 of the skirt portion of the member 60. The spigot 64 is therefore eccentric with respect to the axis of rotation of the manoeuvring member 60, as can be seen in FIG. 4. During the fitting of the member 60 in place, the spigot 64 penetrates into the oblong slot 33 of the reflector 30. It will be noted that the chamfered end 65 of the spigot 64 facilitates this penetration.

It will be understood that the rotation of the member 60 with the aid of a tool co-operating with its socket 61 causes the low point of the reflector 30 to be displaced horizontally in FIG. 3, thus causing the reflector 30 to be tilted about its tilting axis AH, with the spigot 64 sliding in the slot 33 during these movements. The eccentricity of the spigot 64 with respect to the axis of rotation of the member 60 is so chosen that this tilting will take place over an appropriate angular range, for example ±5°.

In order to prevent any accidental displacement of the reflector 30 out of its correct adjustment, safety means are provided for resisting accidental rotation of the member 60 when it is released from the adjusting tool. Two forms of such safety means are as follows by way of example.

In a first form of the safety means, the member 60 and the adjacent part of the housing 10 are so designed that the member 60 rotates with slight friction, the value of this friction being so chosen as to guarantee the long term stability of the adjustment, while at the same time offering the adjusting tool a reaction torque which is not excessive.

The second example of providing these safety means is shown in FIG. 5, and consists in providing, along the whole of the cylindrical periphery of the annular rib 12', projecting elements, such as bosses or pips 12a, of semicircular profile for example, which are slightly spaced apart from each other. The backwardly extending flange 66 of the member 60 has a single boss 66a of semicircular profile. This boss 66 is in resilient engagement against the bosses 12a so as to constitute with the latter a click-action mechanism, which provides mechanical resistance against accidental rotation of the member 60, while at the same time enabling as many stable positions of adjustment to be defined as there are bosses 12a.

It will of course be understood that other forms of safety means for preventing accidental rotation of the member 60 can be envisaged.

One advantage of the adjusting device described above is that it is capable of giving very fine adjustment of the orientation of the reflector within the required range of angles, while at the same having no end stop abutment or the like which would be liable to deteriorate or rupture if the operator exerts too much force on the member 60.

As has already been described above, the reflector, during an adjustment operation, tilts about an axis which passes very close to the filament 21 of the lamp 20.

As has also been indicated above, the reflector 30 is preferably of a type capable of generating a light beam by judicious distribution of the projected images of the filament 21. It will be clear that, in order to achieve this requirement, the position of the filament must be determined with enough precision, failing which the beam is very substantially degraded.

It will readily understood that, if the tilting axis AH of the reflector 30 is as described above, the tilting movement of the reflector consists, as seen from the reflector, of simple tilting with respect to the filament 21 over the angular range of adjustment, in this example ±5°, which is perfectly compatible with obtaining a beam of high quality. In particular, the resulting tilting displacements of certain images of the filament are found to have no significant effect the photometry of the beam, apart from its vertical offset, so long as these offsets are minimal.

Slight errors from the tilting axis AH are of course permissible. In addition, even where the position of the reference focus of the reflector 30 with respect to the filament 21 varies (according to the design of the reflector), it is preferably arranged that the axis AH remains close to the center of the filament in the axial direction, so that relative displacement of the filament, as seen from the reflector, is limited during this last mentioned tilting movement.

The present invention is of course in no way limited to the embodiment described above and shown in the drawings: a person skilled in this art will be able to apply any variation or modification to it in conformity with the spirit of the invention. In particular, a headlight according to the present invention may be used with a wide range of different types of lamps, and in particular with normalized lamps H7, H1, H8, or 9xxx (these being lamps of types used in the United States of America).

What is claimed is:

1. A headlight comprising:

a casing;

a light source mounted in the casing;

a reflector cooperating with the light source to form a light beam of a predetermined photometry and configured for articulation about an axis through the light source;

a cover disposed to enclose a front opening of the casing; and an intermediate housing member extending between an anterior edge of the casing and a peripheral edge of the cover and configured to fasten the headlight to a vehicle.

2. A headlight according to claim 1, wherein the axis passes through the center of the light source in an axial direction.

3. A headlight according to claim 1, wherein the axis passes through a lower edge of the light source.

4. A headlight according to claim 1, wherein the reflector has a pair of opposed side edges and wherein the reflector further comprises at least one pin projecting outwardly from each of the side edges of the reflector, and wherein the casing includes a plurality of apertures on the axis and adapted to engage the pins.

5. A headlight according to claim 4, wherein the casing includes a pair of integral web elements within which the apertures are formed.

6. A motor vehicle headlight, comprising:

a housing;

a light source disposed in the housing;

a reflector disposed in the housing;

an adjusting device mounted in the housing and coupled to the reflector and configured to provide a tilting movement of the reflector in the housing about a tilting axis defined by the reflector; and a bracket element fixed to the reflector, the bracket element having a slot, and wherein the adjusting device further comprises a rotary maneuvering member defining an axis of rotation, the maneuvering member including a driving element disposed eccentrically with respect to said axis of rotation and is slidingly received in the slot of the bracket substantially without clearance, and the rotary maneuvering member being freely rotatable more than 360° about the axis of rotation.

7. A headlight according to claim 6, wherein the tilting axis of the reflector is horizontal, the axis of rotation is vertical, and the slot extends in a horizontal direction substantially parallel to the tilting axis.

8. A headlight according to claim 7, wherein the housing is configured to carry the maneuvering member.

9. A headlight according to claim 8, wherein the bracket extends rearwardly from the reflector.

10. A headlight according to claim 6, wherein the housing includes a second aperture, the maneuvering member extending through the second aperture, the maneuvering member comprising a circular portion and a plurality of snap fitting lugs slightly spaced apart from each other and extending around a surface of said circular portion.

11. A headlight according to claim 10, wherein the maneuvering member further includes a substantially rigid skirt portion extending between said snap fitting lugs, the driving element being formed on the skirt portion.

12. A headlight according to claim 6, wherein the housing and the maneuvering member have two circular surfaces in facing relationship with each other, said surfaces being concentric, a first of said surfaces having a plurality of projecting elements slightly spaced apart from each other, a second of said surfaces having at least one projecting element occupying a position between any two of the projecting elements of the first surface and engaging said projecting elements of the first surface by elastic deformation.

13. A headlight according to claim 12, wherein the maneuvering member has a backwardly extending peripheral flange having an internal face constituting one of the circular surfaces, the housing having a projecting rib with an external face constituting the other of said circular surface.

14. A headlight according to claim 13, further including a sealing ring, the projecting rib including a seating for engaging the sealing ring.

15. A headlight according to claim 6, wherein the maneuvering member has a substantially flat external surface including a socket for receiving a driving tool.

16. A headlight according to claim 6, wherein the bracket element is oriented transversely to the axis of rotation and traversely to an optical axis defined by the reflector.

17. A headlight comprising:

a casing;

a light source mounted in the casing;

a reflector cooperating with the light source to form a light beam of a predetermined photometry and configured for articulation about an axis through the light source;

wherein the reflector is further configured for rotary movement substantially transverse to an optical axis defined by the headlight.

* * * * *